United States Patent [19]
Geary et al.

[11] Patent Number: 4,664,480
[45] Date of Patent: May 12, 1987

[54] ALIGNMENT TECHNIQUE FOR LIQUID CRYSTAL DEVICES

[75] Inventors: John M. Geary, Scotch Plains; Jayantilal S. Patel, Berkeley Heights, both of N.J.

[73] Assignee: American Telephone and Telegraph Company AT&T Bell Laboratories, Murray Hill, N.J.

[21] Appl. No.: 727,573

[22] Filed: Apr. 26, 1985

[51] Int. Cl.[4] .......................... G02F 1/133; G02F 1/16
[52] U.S. Cl. ............................... 350/350 S; 350/350 S
[58] Field of Search ................. 350/350 S, 334, 337, 350/341, 340

[56] References Cited

U.S. PATENT DOCUMENTS

| 3,930,716 | 1/1976 | Robert | 350/350 S X |
| 4,030,997 | 6/1977 | Miller et al. | 350/340 X |
| 4,165,922 | 8/1979 | Morrissy | 350/340 X |
| 4,257,682 | 3/1981 | Suzuki et al. | 350/340 X |
| 4,469,409 | 9/1984 | Nakano et al. | 350/341 |

FOREIGN PATENT DOCUMENTS 101914  8/1980  Japan ................................ 350/340

OTHER PUBLICATIONS

"A Reliable Method of Alignment for Smectic Liquid Crystals," *Ferroelectrics*, vol. 59 (1984), pp. 137-144, J. S. Patel et al.

*Primary Examiner*—Donald A. Griffin
*Attorney, Agent, or Firm*—Michael J. Urbano

[57] ABSTRACT

In a liquid crystal device one interior surface of the cell is coated with a polymer (e.g., a crystalline polymer such as PET) which, when rubbed, produces alignment of the liquid crystal molecules, and the opposite interior surface is coated with a material (e.g., an amorphous polymer, such as PMMA) which, even if rubbed, does not produce such alignment. Also described is a combination of an aligning polymer and a non-aligning, non-polymer (e.g., a silane surfactant or bare ITO). This technique is particularly useful in producing alignment of relatively thick, ferroelectric smectic liquid crystal cells.

16 Claims, 4 Drawing Figures

ALIGNMENT TECHNIQUE FOR LIQUID CRYSTAL DEVICES

CROSS-REFERENCE TO RELATED APPLICATIONS

This application was concurrently filed with two commonly assigned applications: J. M. Geary et al Ser. No. 727,572, entitled "Liquid Crystal Devices", and J. M. Geary, Ser. No. 727,690, entitled "Ferroelectric Liquid Crystal Devices Using Field-Stabilized States".

BACKGROUND OF THE INVENTION

This invention relates to the alignment of liquid crystal (LC) molecules in liquid crystal devices. Although the description which follows deals with liquid crystal displays (LCDs), the primary intended application, the invention is also useful in other devices such as optical shutters.

In a conventional LC cell the interior major surfaces of the glass plates are each coated with a polymer. The polymer layers are rubbed (e.g., with a cloth) to orient the polymer chains along a predetermined direction. LC molecules contacting the polymer align themselves along the predetermined direction. Thus, the polymer layers are known in the LC art as alignment layers. In the absence of such layers, the LC molecules at the cell surface would tend to orient themselves randomly in contrast with being pinned by the boundary conditions established by the alignment layers.

Nematic LC materials, for example, can be easily aligned by coating both of the interior surfaces of the cell with a polymer (usually polyimide) and by unidirectional rubbing of both of the polymer layers. If an appropriate crystalline polymer is used, such a surface treatment can also align smectic LC materials.

SUMMARY OF THE INVENTION

We have found, however, that the use of crystalline alignment layers on both cell surfaces of a smectic cell gives significantly poorer alignment characterized by numerous low-angle defects. In particular, with such alignment layers on both surfaces growth of the smectic phase from the isotropic phase occurs from both surfaces and extends toward the mid-plane of the cell. When the smectic phases from opposite surfaces meet, however, rapid flow of the LC material causes defects to occur at the interface where the smectic phases meet one another.

In accordance with one aspect of our invention, a smectic LC device has one interior cell surface coated with an aligning layer and the opposite interior cell surface coated with a non-aligning layer. In such a device, growth of the smectic phase advantageously begins at the aligning layer surface and grows across the cell thickness to the opposite side. Growth does not nucleate on the non-aligning layer, however. Thus, growth is essentially unidirectional and the number of disclinations is substantially reduced. In effect, the alignment produced by the aligning layer is translated through the stiffness of the smectic molecules to the opposite cell surface; i.e., although the molecules at the non-aligning layer are not pinned by interaction with that layer, they are nevertheless held in alignment by the combined effect of the molecular stiffness and the pinning of the opposite end by the aligning layer.

Illustratively, the two cell surfaces are coated with different polymers; that is, one surface is coated with an amorphous, non-aligning polymer and is left unrubbed, whereas the other surface is coated with an aligning polymer and is rubbed. In another embodiment the non-aligning layer is a non-polymer. The invention exhibits improved alignment quality, latching and multiplexing for smectic LC materials in relatively thick cells ($\gtrsim 2$ $\mu$m thick), but may also be advantageous in thin cells (i.e., those <2 $\mu$m thick).

BRIEF DESCRIPTION OF THE DRAWING

Our invention, together with its various features and advantages, can be readily understood from the following more detailed description taken in conjunction with the accompanying drawing, in which:

FIG. 2, parts (a) and (b), show a schematic cross-section drawing and a photograph, respectively, of initial smectic A phase regions. FIG. 3, parts (a) and (b), show a schematic cross-section drawing and photograph, respectively, of a more advanced stage. Regions of contact to the opposite surface are evident in the photograph of FIG. 3(b). When the smectic A phase completely fills the cell, the sample looks featureless.

DETAILED DESCRIPTION

Figure 1:
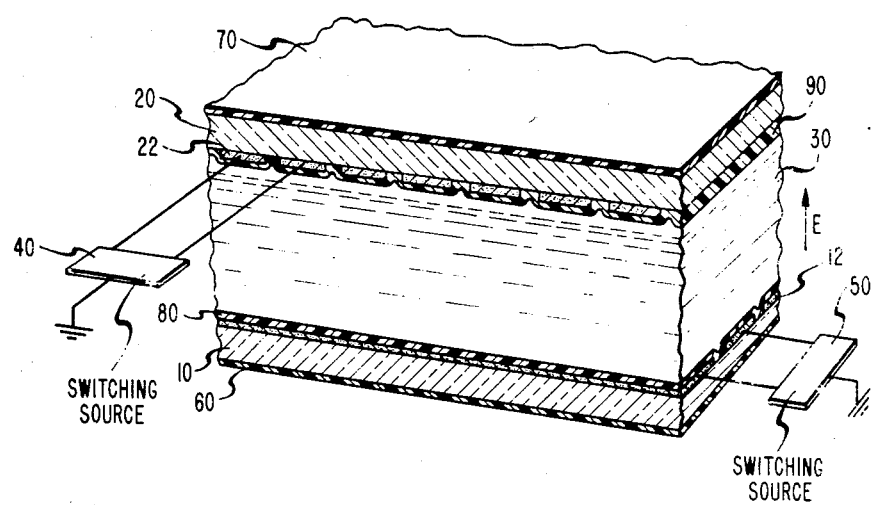
FIG. 1 is a schematic, isometric view of a LCD in accordance with one embodiment of our invention.

With reference now to FIG. 1, there is shown a schematic, isometric view of a portion of a liquid crystal (LC) device, illustratively a cell for use in a liquid crystal display (LCD). The cell includes confinement means such as a pair of essentially parallel plates 10 and 20 which bound a smectic LC material 30 therebetween. The layers (not shown) of the smectic material are oriented essentially perpendicular to the plates. The smectic LC material may include a single smectic constituent or a plurality of such constituents (e.g., a mixture of smectic components having opposing twist senses as described in the concurrently filed application, J. M. Geary et al, Ser. No. 727,572 supra). The plates 10 and 20, which are transparent to light, have interior major surfaces on which are deposited electrodes 12 and 22. Where light is to be transmitted through an electrode, it should be made of transparent material. In an arrangement for matrix addressing or multiplexing the electrodes are patterned to form arrays of closely spaced stripes, with the two arrays being oriented transverse (e.g., perpendicular) to one another. Thus, the LC volume in the region of overlap of each pair of stripes defines a picture element (pel).

The individual pels are selectively addressed by means of suitable electronic circuitry illustratively depicted as a switching source 40 connected to the array of electrodes 22 and a switching source 50 connected to the array of electrodes 12. For simplicity, only two connections to each array are shown. The sources 40 and 50 apply suitable voltages across selected electrodes, thereby applying an electric field E across a preselected pel. The field across the liquid crystal is essentially perpendicular to the cell surfaces.

Means for providing optical contrast illustratively includes polarizers 60 and 70 formed on the glass plates 10 and 20. The polarizers may be oriented parallel or perpendicular to one another, and in ferroelectric (e.g., smectic C) cells they are also oriented at approximately the smectic tilt angle to the normal to the smectic layers.

When used in the common reflection mode, the cell is also provided with a reflector (not shown) which reflects light transmitted through the cell for retransmission out the viewing surface.

In order to align the molecules of the liquid crystal material 30, the cell is further provided with a pair of layers 80 and 90 on the interior surfaces of the cell. In one embodiment, these layers cover at least the electrodes in the regions where the electric field is applied to the liquid crystal material. Illustratively, the layers 80 and 90, as shown, cover the electrodes 12 and 22 as well as the interstitial spaces therebetween. In accordance with one aspect of our invention, layer 80 (the "aligning" layer) aligns the molecules of the liquid crystal along a predetermined direction, whereas layer 90 (the "non-aligning" layer) does not produce such alignment. The aligning layer is mechanically deformed (e.g., by rubbing its surface with a cloth) to orient the polymer chains along a predetermined direction. The non-aligning layer reduces the wetting affinity for the smectic phase (e.g., A or C phase) relative to the non-smectic phase (e.g., isotropic or cholosteric phase).

In one embodiment, the layers 80 and 90 are different polymers, aligning layer 80 being crystalline and non-aligning layer 90 being amorphous. Alternatively, non-aligning layer 90 may be a non-polymer, such as a silane surfactant or indium tin oxide (ITO), which does not produce alignment of the liquid crystal molecules. Since ITO is a common electrode material, it is apparent that, in another embodiment, the non-aligning layer 90 and the electrodes 22 are one and the same but serve dual functions: to reduce wetting affinity and to allow an electric field to be applied across the LC material.

For a smectic LC cell the aligning layer 80 is illustratively a polymer that acquires an oriented crystalline form by mechanical deformation, which form is retained at temperatures experienced in cell assembly and filling. In contrast, the non-aligning layer 90 is illustratively a polymer which is substantially amorphous. The crystalline polymers are deformed by rubbing (e.g., with a cloth), thereby producing shearing deformation. The resulting surface of polymer chains in oriented crystalline form serves to nucleate an aligned, homogeneous smectic texture when the LC material is cooled from an isotropic or non-smectic phase to a smectic one. On the other hand, nucleation does not occur on the amorphous polymer surface and the smectic material grows from the aligning layer 80 to the non-aligning layer 90.

Alignment, threshold and latching characteristics obtained in accordance with our invention exhibit superior results especially when used in relatively thick cells ($\gtrsim 2$ μm), but are expected to be advantageous in thin cells ($<2$ μm) also.

Illustrative crystalline polymers for use as aligning layer 80 include nylon, PET, PBT or polyvinyl alcohol. Suitable materials for non-aligning layer 90 include unrubbed PMMA, unrubbed polycarbonate, unrubbed polystyrene, unrubbed bare ITO, and silane surfactants. At present, however, the preferred combination for use with smectic liquid crystal mixtures employs rubbed PET for the aligning layer 80 and unrubbed PMMA for the non-aligning layer 90.

EXAMPLE I

Alignment obtained using two polymers in accordance with one embodiment of our invention was studied and compared with other alignment methods. The cells contained a chiral, smectic mixture containing 77 weight percent of the first constituent listed below and 23 weight percent of the second:

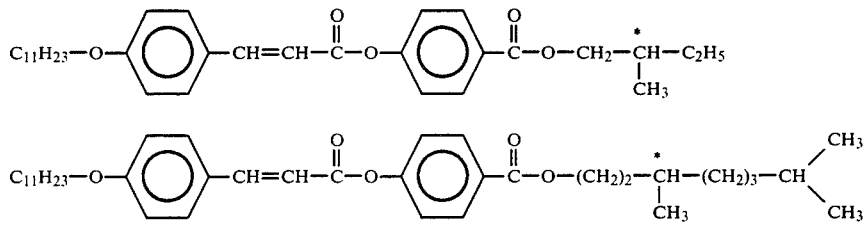

where the asterisk denotes the active chiral center of each molecule. A total of about 10 mg of the mixture was weighed on a microscope slide, heated to melting in the isotropic phase, stirred and then cooled to room temperature. The mixture was then ready for use.

This mixture was chosen (1) because materials of this kind are good candidates for practical applications in ferroelectric liquid crystal displays and (2) because the mixture exhibits a broadened phase transition, making the sequential stages of the alignment process easy to photograph. The mixture has the phase sequence: isotropic→smectic A→smectic C. Although the ferroelectric smectic C phase is of practical interest for displays, here only the isotropic→smectic A transition was studied, because in that transition the alignment of the smectic layers is established. This alignment is retained in the smectic C phase, but it is more difficult to observe in the smectic C phase because the texture is complicated by the formation of ferroelectric domains.

In accordance with the preferred embodiment noted above, one interior major surface of the cell was coated with PET and rubbed to form aligning layer 80; the other surface was coated with PMMA and left unrubbed to form non-aligning layer 90. The surfaces were spaced 6 μm apart, well into thick-cell regime. The PET was rubbed against cotton cloth at 13 g/m² pressure and with a velocity of 5 cm/sec for a distance of 40 cm. The cell was filled by capillary action with the above LC mixture in the isotropic phase and then was cooled slowly (0.3° C./min) through the isotropic→smectic A transition at about 92° C. Photomicrographs were taken between crossed polarizers at several stages during the transition.

Figure 2:
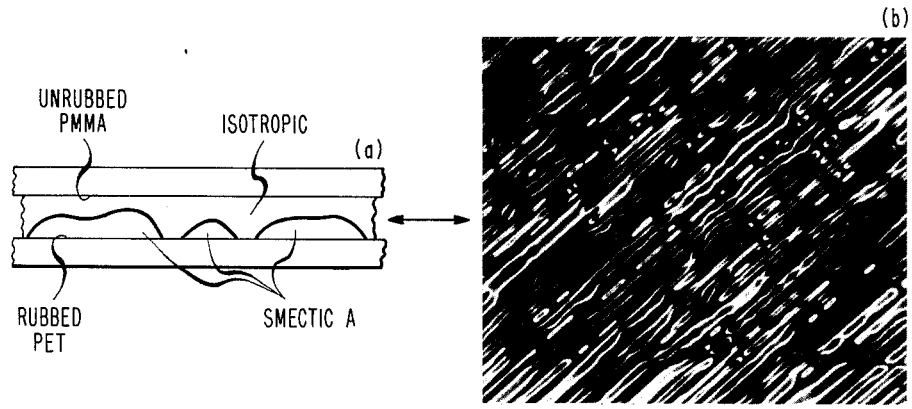
FIGS. 2 and 3 show the stages in the formation of an aligned texture in a thick (6 $\mu$m) cell using two different polymers in accordance with one embodiment of our invention.

In the micrograph of FIG. 2b, material in the smectic A phase has appeared in the form of long streaks. Such streaks are commonly observed in smectic alignment in both thick and thin cells. The streaks were oriented along the direction of rubbing and may be due to small-scale variations in rubbing pressure caused by the uneven texture of the cloth. The smectic A phase material exhibited good extinction, indicating that it was aligned. This result implies that nucleation occurred on the rubbed surface, with subsequent growth toward the unrubbed surface. If any material had nucleated on the unrubbed surface, it would not have had a preferred direction of orientation and a chaotic texture would have been observed. This preference to nucleate on the rubbed surface could not have been caused by unintentional thermal gradients, since the same behavior was seen when the sample was inverted in the heating fixture. The rubbed surface itself, with its oriented, crystalline character, seems to trigger smectic formation in a manner resembling epitaxial crystal growth. In the micrograph of FIG. 2b, the alignment axis is at 45° with respect to the polarizer's axis, and birefringent light and dark bands can be seen, indicative of the thickness variations of the smectic A phase regions. Inspection of the bands indicates a humped configuration of the type depicted in FIG. 2a.

Figure 3:
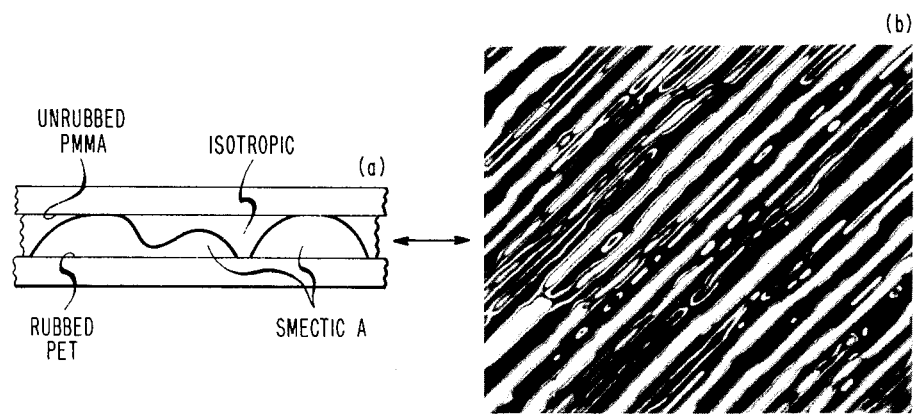

As the sample was cooled further, the smectic A phase region grew higher and eventually contacted the opposite cell surface. Areas of contact are evident in the micrograph of FIG. 3b as bright regions of constant birefingence. When contact was made, the initial area of contact did not expand abruptly, indicating little wetting affinity of the smectic A phase (relative to the isotropic phase) for the PMMA surface. As the transition continued, the separate smectic A phase regions joined, and finally the entire cell was in the smectic A phase. In this state the smectic A phase presented a blank, nearly featureless appearance, indicating good alignment. Observing the last stages of the transition, with the alignment axis oriented nearly parallel to the polarizer axis, many of the remaining defects healed as the smectic A phase regions fused.

EXAMPLE II

Further experiments were performed to compare quality of alignment obtained by the above preferred alignment method using PET (rubbed) and PMMA (unrubbed) with two alternative techniques: (1) PET (rubbed) on one cell surface and PET (unrubbed) on the other, and (2) PET (rubbed) on both surfaces. These comparisons were designed to test the importance of a significant feature of our invention: the use of an aligning layer (a rubbed polymer) on only one side of the cell, and the use on the other side of a non-aligning layer (an unrubbed polymer, such as PMMA, that could not cause alignment even if rubbed).

Quality of alignment was assessed by repeating the experiment of Example I with cells prepared according to the two alternative methods. After the smectic A phase was formed, it was photographed between crossed polarizers with the alignment axis parallel to the polarizer axis. Under these conditions, any defects in alignment were easily seen. The aligned textures were formed with both a slow cooling rate of about 0.3°/min. (as in Example I) and also a faster rate of about 0.3°/sec.

Figure 4:
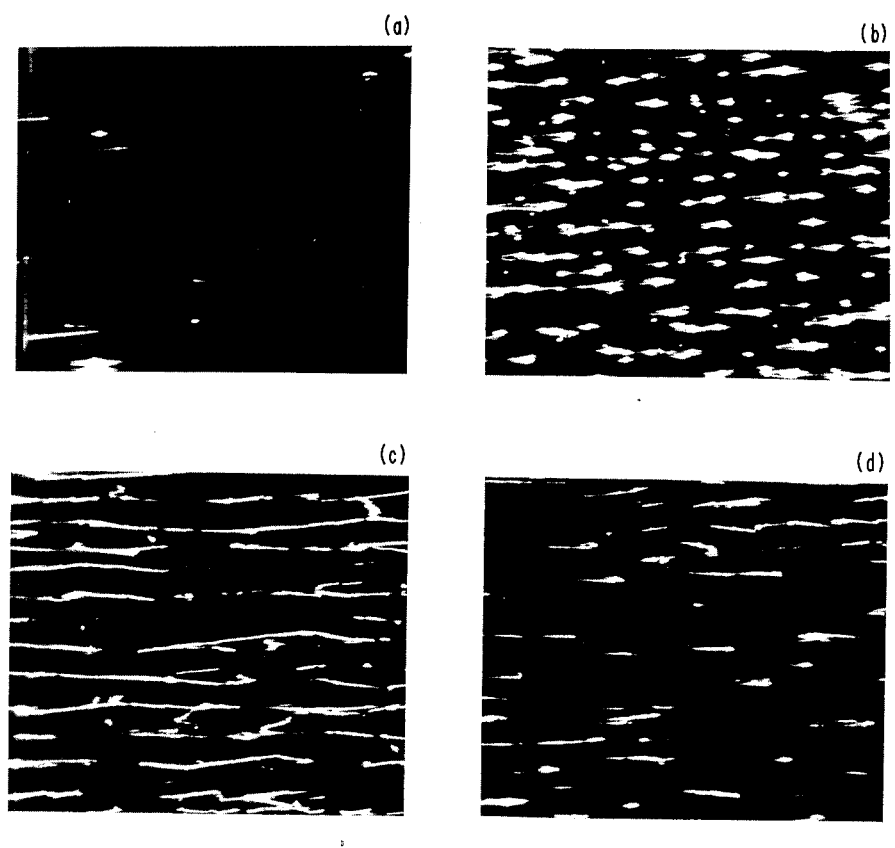
FIG. 4 shows photographs of fully formed, smectic A phases prepared by three different techniques: part (a)—PET (rubbed) and PMMA (unrubbed) which corresponds to the two-polymer technique in accordance with one embodiment of our invention; part (b)—PET (rubbed) and PET (unrubbed); parts (c) and (d)—PET (rubbed) and PET (rubbed) which corresponds to a conventional alignment technique. In part (d), the rubbing directions are accurately parallel; in part (c) an error of about 2° exists. The samples were all oriented parallel to the polarizer axis to show up flaws clearly.

Results for the three cases are shown in FIG. 4. Alignment quality was similar for both fast and slow cooling rates, and only the slow rate results are shown. FIG. 4a demonstrates the result of our two-polymer technique using the combination of PET (rubbed) aligning layer and PMMA (unrubbed) non-aligning layer. FIG. 4b shows the results for the combination of PET (rubbed) and PET (unrubbed), and FIG. 4c shows the results for the combination of PET (rubbed) and PET (rubbed). Of these three methods, the two-polymer method in accordance with one embodiment of our invention is clearly superior. In FIG. 4b, numerous focal conic defects are seen. In FIG. 4c, the texture is disrupted by regions whose alignment direction is inclined at about ±10° with respect to the rest of the sample, as well as by other defects.

In the sample of FIG. 4c, the rubbing axes were known to be parallel to within a few degrees. Nevertheless, there was the possibility that the poor alignment may have been caused by the rubbing axes of the glass plates not being accurately parallel. This hypothesis was tested by an "arc rubbing" technique in which one PET-coated plate was rubbed on the cloth with a circular motion. The radius of the arc was 3 cm at the test area, yielding a ±8° variation in rubbing direction across the plate. The other PET coated segment of the cell was rubbed in the conventional linear way. The assembled cell exhibited all relative orientations of rubbing direction over the range of +8° to −8°. Exact parallelism was sure to occur somewhere between these two extremes.

The arc-rubbed cell was filled and cooled like the cells of FIGS. 4a, b, c. Poor alignment was seen at the extreme edges of the cell. A narrow region near the center exhibited relatively good alignment and presumably represents the region of nearly exact parallelism. FIG. 4d is a photograph from this region. Though improved, the alignment quality is still not as good as that shown in FIG. 4a for the two-polymer technique in accordance with our invention. It was found that by moving away from the region of best alignment by a distance corresponding to 2°, alignment quality was reduced to a state similar to that of FIG. 4c.

EXAMPLE III

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, additional experiments were performed to demonstrate the effectiveness of alternative non-aligning layers 90 in combination with a rubbed PET aligning layer 80. Two cells containing the above LC mixture were tested: one with PET (rubbed) and polycarbonate (unrubbed) which is an amorphous polymer; the other with PET (rubbed) and bare ITO (unrubbed) which is a non-polymer. Both cells worked well. The first combination of PET (rubbed) and polycarbonate produced good alignment. Similarly, the second combination of PET (rubbed) and bare ITO (unrubbed) produced good alignment and good threshold characteristics.

In addition to the foregoing smectic mixture, our invention is also applicable to the alignment of ferroelectric smectic materials of the type described in the copending application J. W. Goodby et al, Ser. No. 361,361 filed on Mar. 23, 1982 entitled "Liquid Crystal Devices", as well as the ferroelectric mixtures of chiral components having opposite twist senses described in the concurrently filed application, J. M. Geary et al, Ser. No. 727,572 supra. One of the latter ferroelectric mixtures exhibited good alignment using PET (rubbed) as the aligning layer and polystyrene (unrubbed) as the non-aligning layer.

EXAMPLE IV

In a 12 μm thick cell having ITO electrodes, the aligning layer comprised either rubbed nylon 6 or rubbed PBT and the non-aligning layer was a silane surfactant formed from a 0.1% solution of octodecyltrichlorosilane in THF (tetrahydrofuran). The latter layer was formed by treating one of the cell plates with the solution, spinning the plate for 10 sec at 4000 rpm, and then baking at 120° C. for 15 min. Although these parameters are not critical, the concentration of the surfactant should not exceed about 0.2% in order to avoid homeotropic alignment.

When the cell was filled with either a single smectic component LC (i.e., M30 which is commercially available from EM Chemicals, Hawthorne, N.Y.) or a mixture of smectics LCs (e.g., one of those described in the concurrently filed application J. M. Geary, Ser. No. 727,572 supra), we observed that the surfactant decreased wetting and the cell exhibited good alignment.

Similar experiments demonstrated that trimethylchlorosilane is also an effective non-aligning layer.

Dynamics of Alignment

The causes of different alignment quality in the three techniques described above in Example II were studied by visual observation of the process by which the smectic A phase forms. A previously mentioned, with our two-polymer technique (FIG. 4a) relaxation and healing of defects are seen as the irregular smectic A phase regions join. No miniscus abruptly formed; that is, when viewed through a microscope, the smectic A phase did not appear to "jump into contact" as it encountered the opposite surface of the cell. Hence, no abrupt flow occurred which would disrupt alignment. Evidently the amorphous, non-aligning PMMA surface exhibited little wetting by the forming smectic A phase. When smectic A phase regions joined with each other, they did so in contact with the aligning PET surface, which seemed to stabilize their orientation as the regions fused together.

In the PET (rubbed)-PET (unrubbed) cell (FIG. 4b), the smectic A phase again nucleated on the PET rubbed face and advanced toward the PET unrubbed face. As the smectic A phase regions made contact with the unrubbed surface, they appeared to wet it strongly, as evidenced by the rapid expansion of the contact area after first contact was made. Even if cooling was very slow, the jump upon contact was rapid and appeared to cause orientation-disrupting flow of the smectic A phase material. As the transition proceeded, defects did not heal as the smectic A phase regions fused, evidently because the stronger interaction with the crystalline PET surface did not permit molecular rearrangement of the smectic A phase.

Similar phenomena were seen in the cell where both surfaces were coated with rubbed PET (FIGS. 4c and d). In much of the area, smectic A phase regions nucleating on both faces encountered the opposing face in regions where no smectic A phase material had yet nucleated and jumped into contact, as above. In other cases, smectic A phase regions from the opposite faces encountered each other directly. This smectic A phase-to-smectic A phase contact also yielded an abrupt, defect-forming flow that resulted in the bright, tilted flaws of FIG. 4c, where slight misalignment of the rubbing axes existed. These flaws were significantly suppressed when the rubbing axes were parallel to an accuracy of 1° or better (FIG. 4d). It is likely that this high degree of sensitivity to rubbing axis parallelism is related to the stiffness of the smectic layers.

What is claimed is:

1. A liquid crystal device comprising
   a cell containing a smectic liquid crystal material, which during cell formation can have smectic or nonsmectic phases, and having first and second spaced, essentially parallel plates bounding said liquid crystal material,
   an aligning layer on a first interior major surface of said first plate, said aligning layer being mechanically deformed along a predetermined direction which causes the molecules of said liquid crystal material at said first surface to align along said direction, and
   a non-aligning layer on a second interior major surface of said second plate which does not align said molecules at said second surface.

2. The device of claim 1 wherein said non-aligning layer comprises a material such that the smectic phase of said liquid crystal material has a lower affinity for wetting than said nonsmectic phase.

3. The device of claim 1 wherein said aligning layer comprises a first polymer and said non-aligning layer comprises a second polymer different from said first polymer.

4. The device of claim 3 wherein said first polymer comprises a crystalline polymer and said second polymer comprises an amorphous polymer.

5. The device of claim 4 wherein said first polymer comprises a material selected from the group consisting of PET, PBT, nylon, and polyvinyl alcohol.

6. The device of claim 3, 4 or 5 wherein said second polymer comprises a material selected from the group consisting of PMMA, polycarbonate and polystyrene.

7. The device of claim 1 wherein said aligning layer comprises a crystalline polymer and said non-aligning layer comprises indium tin oxide.

8. The device of claim 7 wherein said indium tin oxide layer is patterned to form electrodes on said second surface.

9. The device of claim 1 wherein the thickness of said crystal material between said essentially parallel plates is $\gtrsim 2$ μm.

10. The device of claim 1 wherein said non-aligning layer comprises a silane surfactant.

11. The device of claim 10 wherein said surfactant comprises a solution of octodecyltrichlorosilane in a solvent.

12. The device of claim 10 wherein said surfactant comprises a solution of trimethylchlorosilane in a solvent.

13. The device of claim 1, 2, 3, 4, 5, 7, 8, 9, 10, 11 or 12 wherein said liquid crystal material is ferroelectric.

14. A liquid crystal display comprising
- a cell containing a ferroelectric, smectic liquid crystal material and having first and second spaced, essentially parallel transparent plates bounding said liquid crystal material, a first array of electrodes on a first interior major surface of said first plate and a second array of electrodes on a second interior major surface of said second plate,
- an aligning layer comprising a crystalline polymer covering said first array of electrodes and being mechanically deformed along a predetermined direction which causes the molecules of said liquid crystal material at said first surface to align along said direction,
- a non-aligning layer comprising an amorphous polymer covering said second array of electrodes, said amorphous polymer having the characteristic that it does not align said molecules at said second surface,
- the thickness of said liquid crystal material between said essentially parallel plates being $\gtrsim 2$ $\mu$m,
- means for providing optical contrast of electromagnetic radiation transmitted through said liquid crystal material, and
- means for applying voltage to selected ones of said electrodes in each of said arrays.

15. The display of claim 14 wherein said aligning layer comprises a material selected from the group consisting of PET, PET, nylon, and polyvinyl alcohol.

16. The display of claim 14 or 15 wherein said non-aligning layer comprises a material selected from the group consisting of PMMA, polycarbonate and polystyrene.

* * * * *